United States Patent [19]

Franklin et al.

[11] Patent Number: 5,214,756
[45] Date of Patent: May 25, 1993

[54] DIRECT MANIPULATION OF ICONS VIA CONVERSATIONAL LINKING

[75] Inventors: Susan M. Franklin, Irving; Anthony M. Peters, Bedford, both of Tex.

[73] Assignee: International Business Machines Corporation, Armonk, N.Y.

[21] Appl. No.: 950,989

[22] Filed: Sep. 22, 1992

Related U.S. Application Data

[63] Continuation of Ser. No. 321,930, Mar. 10, 1989, abandoned.

[51] Int. Cl.$^5$ .............................................. G06F 15/62
[52] U.S. Cl. .................................... 395/159; 395/161
[58] Field of Search .............. 395/159, 161, 155, 156, 395/157, 158, 160; 340/720, 723, 724

[56] References Cited

U.S. PATENT DOCUMENTS

| | | | |
|---|---|---|---|
| 4,555,775 | 11/1985 | Pike . | |
| 4,658,351 | 4/1987 | Teng | 364/200 |
| 4,739,477 | 4/1988 | Barker et al. | 364/900 |
| 4,742,467 | 5/1988 | Messerich et al. | 364/200 |
| 4,813,013 | 3/1989 | Dunn | 364/900 |
| 4,866,638 | 9/1989 | Cosentino et al. | 364/900 |
| 4,896,290 | 1/1990 | Rhodes et al. | 364/900 |
| 4,896,291 | 1/1990 | Gest et al. | 364/900 |
| 4,937,036 | 6/1990 | Beard et al. | 364/200 |
| 4,945,476 | 7/1990 | Bodick et al. | 364/200 |
| 4,982,234 | 1/1991 | Fillion et al. | 364/200 |
| 4,982,344 | 1/1991 | Jordan | 364/900 |

OTHER PUBLICATIONS

*Microsoft Systems Journal*, Interprogram Communications Using Windows' Dynamic Data Exchange, Kevin P. Welch, Nov. 1987, pp. 13–38.

*Primary Examiner*—Heather R. Herndon
*Attorney, Agent, or Firm*—Andrew J. Dillon

[57] ABSTRACT

A method is disclosed which permits the user of a computer system to directly manipulate iconic representations of software applications by automatically controlling the communications link between each icon and its associated source application. Upon receiving an indication that a user intends to move an icon displayed within a first client application, communications between the first client application and the icon's source application are automatically terminated. The icon is placed within a second client application and communications between the second client application and the source application are automatically initiated. In the disclosed embodiment of the present invention a conversational data structure designed to support communication between a client application and a source application is automatically created in response to an initiate communications message from a client application to a source application, after a determination has been made that the icon in question is appropriately served by the source application. Client applications containing multiple icons may be simply and easily duplicated by graphically copying each icon and automatically initiating communication between the source application and the application containing the copied icon.

4 Claims, 3 Drawing Sheets

DIRECT MANIPULATION OF ICONS VIA CONVERSATIONAL LINKING

This application is a continuation of application Ser. No. 07/321,930, filed Mar. 10, 1989, now abandoned.

BACKGROUND OF THE INVENTION

1. Technical Field

The present invention relates in general to data processing systems and in particular to multi-tasking data processing systems. Still more particularly, the present invention relates to methods which permit the direct manipulation of icons from one application to another within a multi-tasking data processing system.

2. Background Art

Early microcomputers or "personal" computers were designed to provide independent computing power to an individual user. Although designed initially for stand-alone operation, it has become common for individual computers to be coupled together or to a main frame computer by means of a computer network. In recent years the personal computer has become so sophisticated that many are now capable of "multi-tasking," that is, the concurrent performance or interleaved execution of two or more tasks.

Multi-tasking is generally accomplished in a personal computer environment by utilization of multiple view ports or "windows," each of which displays information relating to a different application. Examples of such multi-tasking systems include *Windows*, published by Microsoft, Inc. and *OS/2 Presentation Manager*, published by International Business Machines Corporation. With either of the aforementioned multi-tasking systems it is possible to provide a "tokenized" or miniature representation of individual applications, generally referred to as "icons." These icons may be displayed within a window and are thus available to a user of that window. This technique is possible when an application draws, maintains, and positions icons for tasks that it may provide within its window. Utilization of these icons by another independent application is not possible without a published set of complex programming interfaces. Likewise, the movement of these icons from the application to another window is not possible without such interfaces.

If the application providing function via icons are structured such that they are independent of the application displaying the icons, an existing data transfer protocol may be utilized to more simply accomplish the transfer of the icon and the associated application function from one window to another. A protocol known as Dynamic Data Exchange (DDE) utilized by both *Windows* and *OS/2 Presentation Manger* may be used for this technique.

DDE is a protocol for interprocess communication which consists of a small set of messages and data structures designed to support the interaction between two processes. The communications model utilized by DDE is based upon a client/source application relationship wherein the client application initiates a conversation with the appropriate source application and data then flows from the source application to the client application, supporting the icon disposed therein. For a more detailed description of DDE see *Microsoft Systems Journal,* November 1987, page 13.

While DDE represents an important step forward in multi-tasking environments, it has at least one short fall which must be addressed. A user may desire to transfer an icon from one application to a second client application. Under existing protocols this is a time consuming process which requires a complex programming interface and which may not be accomplished directly. Therefore, it should be obvious that a need exists for an improved method whereby iconic representations of selected applications may be directly manipulated by a user so that an application may be easily transferred to a second client application.

SUMMARY OF THE INVENTION

It is therefore one object of the present invention to provide an improved data processing system.

It is another object of the present invention to provide an improved multi-tasking data processing system.

It is yet another object of the present invention to provide an improved multi-tasking data processing system which permits the direct manipulation of icons and associated functions from one application to another.

The foregoing objects are achieved as is now described. A user may directly manipulate iconic representations of software applications in accordance with the present invention by controlling the communication link between each icon and its associated source application. Upon receiving an indication that a user intends to move an icon displayed within a first client application, communications between that first client application and the icon's source application are automatically terminated. Then the icon is placed within a second client application and communications between the second client application and the source application are automatically initiated. In the disclosed embodiment of the present invention a conversational data structure designed to support communication between a client application and a source application is automatically created in response to an initiate communication message from a client application to a source application, after a determination has been made that the icon in question is appropriately served by that source application. Client applications containing multiple icons may be simply and easily duplicated by copying each icon and automatically initiating communications between the source application for that icon and the application containing the copied icon.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
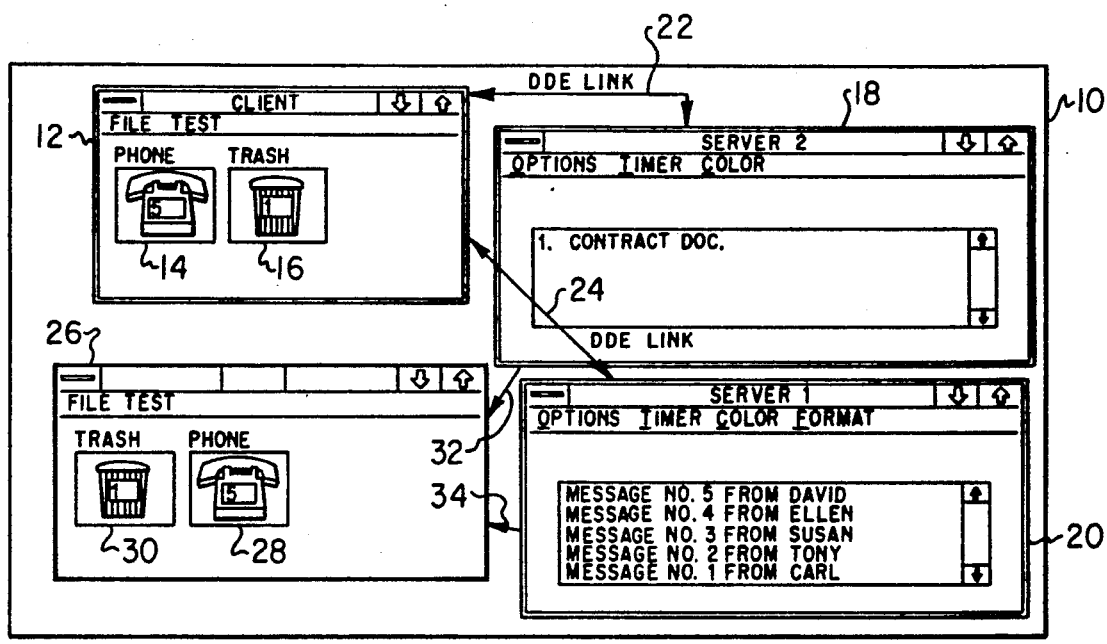
FIG. 1 depicts a graphic representation of a computer screen demonstrating the copying of a client application having multiple icons displayed therein.

Throughout the following description, the term "source" application is utilized to describe the program providing the function represented by an icon and the term "client" application is utilized to describe the application providing the window which displays the icon. With reference now to the figures and in particular with reference to FIG. 1, there is depicted a graphic representation of a computer screen demonstrating the copying of a client application having multiple icons displayed therein. As may be seen, computer screen 10 includes a client application which is displayed within a viewport or "window" 12, in a manner well known in the prior art. Displayed within window 12 are icons 14 and 16, each of which represents another software application. As may be seen, icon 14 is indicative of a communications application and is supported by a source application which is displayed, for purposes of illustration, within window 20. The communications necessary to serve the application represented by icon 14 are provided from the source application depicted within window 20 to window 12 by means of DDE link 24. Similarly, icon 16 represents a second application which is supported by a second source application, depicted within window 18. As above, the communications necessary to support the application represented by icon 16 are provided from the source application depicted within window 18 to window 12 by means of DDE link 22.

Now, in accordance with an important feature of the present invention, should the user desire to copy the application depicted within window 12, he or she may do so by creating window 26. As those skilled in the art will appreciate this may be accomplished by utilizing any technique known in the prior art for the graphic duplication of an element or window displayed on a computer screen. However, in accordance with an important feature of the present invention, after window 26 has been created as a copy of window 12, including icons 28 and 30, a conversational link between the source applications depicted within windows 18 and 20 will be automatically established. That is, the communications necessary to support the application depicted by icon 30 will be provided from the source application depicted within window 18 by the automatic initiation of communication between the source application and the client application by means of the establishment of a communications link via DDE link 32.

Similarly, the communications necessary to support the application represented by icon 28 will be automatically initiated, in accordance with the method of the present invention, by the automatic initiation of DDE link 34, between the source application depicted within window 20 and the client application established within window 26. In this manner, the user may copy a client application containing numerous iconic representations of other applications without the necessity of explicitly establishing communication between each iconic representation and its associated source application.

Figure 2:
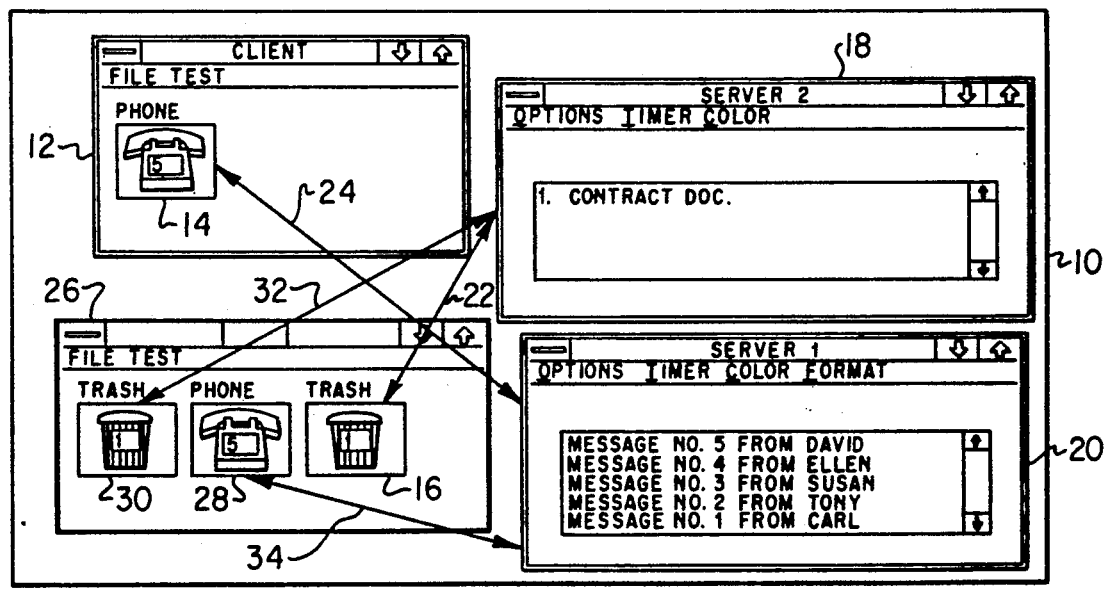
FIG. 2 depicts a graphic representation of a computer screen demonstrating the relocation of an icon from one client application to a second client application.

Referring now to FIG. 2, there is depicted a graphic representation of a computer screen demonstrating the relocation of an icon from one client application to a second client application. As may be seen, computer screen 10 includes a first client application which is displayed within a window 12 and a second client application which is displayed within window 20. As above, each client application may include multiple icons such as 14, 16, 28 and 30, each of which is supported by a source application. For purposes of illustration the source application supporting icons 16 and 30 is displayed within window 18 and the source application supporting icons 14 and 28 is displayed within window 20. Referring again to FIG. 1, it may be seen that icon 16 has been relocated from window 12 to window 20. This has been accomplished, in accordance with the method of the present invention, by terminating DDE link 22 upon recognition of the intent of the user to remove icon 16 from window 12. As may be seen, after the user has indicated his or her desire to relocate icon 16 within window 20, DDE link 22 has been automatically reinitiated so that the communications necessary to support icon 16 within window 20 are reestablished.

Figure 3:
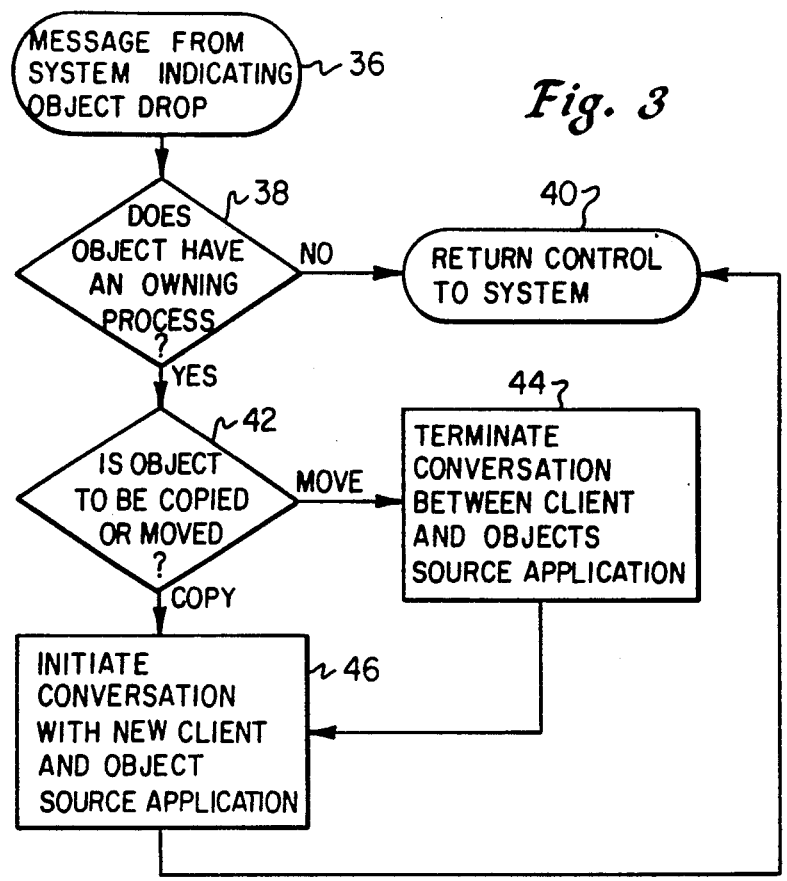
FIG. 3 depicts a logic flow chart illustrating the direct manipulation logic of the method of the present invention.

With reference now to FIG. 3, there is depicted a logic flow chart illustrating the direct manipulation logic of the method of the present invention. As may be seen, the process begins at block 36 wherein a message is received from the system indicating that an object, such as an icon, has been selected for manipulation. Next, block 38 illustrates the determination of whether or not the object selected for manipulation has an owning or source process. If not, the process returns control to the system, as depicted in block 40.

In the event that the object selected for manipulation does indeed have an owning or source process, then block 42 illustrates a determination of whether or not the object is to be copied or moved. In the event the object selected for direct manipulation is to be moved, as determined by block 42, then block 44 illustrates the termination of the DDE conversation link between the client application and the object's source application. This process will be illustrated in greater detail with respect to FIG. 5. Thereafter, block 46 illustrates the initiation of a conversation link between the new client application and the object source application. In this manner, an icon or other object may be directly manipulated by the user without the necessity of complex programming interfaces by automatically terminating the conversation link between the icon's previous client application and its source application and thereafter initiating a conversation link between the new client application wherein the icon is now located and the source application for that icon. Referring again to block 42, if the object selected for direct manipulation is to be merely copied, as determined by block 42, then the process proceeds directly to block 46 and a conversation link is initiated between the source application servicing the icon and the new client application wherein the copy is to be located.

Figure 4:
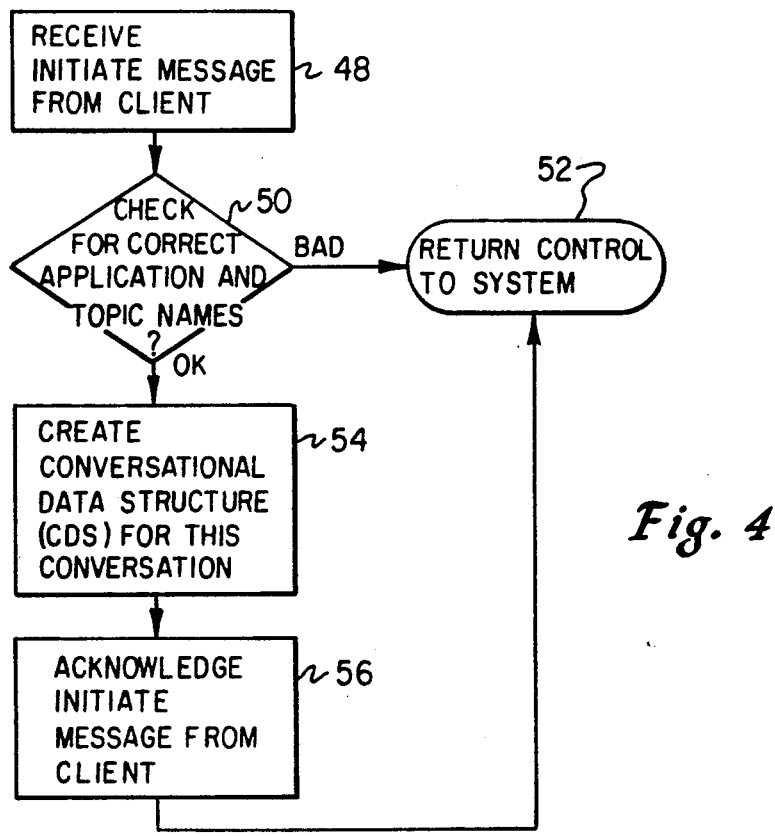
FIG. 4 depicts a logic flow chart illustrating the initiation of communication between a source application and a client application.

Referring now to FIG. 4, there is depicted a logic flow chart illustrating the initiating of communication between a source application and a client application in accordance with the method of the present invention. As may be seen, this process begins by the receipt of an initiate communications message from a client application. This message is transmitted by a client application, in accordance with the method of the present invention, automatically in response to the graphic relocation or copying of an object into the client application. Next, block 50 illustrates the determination of whether or not the correct application and topic names are present for communication between the client application and the source application which has received the initiate communications message. This is necessary to determine if the icon in question is appropriately served by the source application which has been selected. If the application and topic names are not correct, then, as illustrated in block 52, the control is returned to the system.

In the event the correct application and topic names are present, block 54 then illustrates the creation of a conversational data structure for this conversation. The conversational data structure preferably consists of structures designed to support interprocess communication between the client application and the source application. Next, the process is completed by the transmittal of an acknowledgement from the source application to the client application acknowledging the initiate communication message which has been received. Thereafter, the source application is conversationally linked with the client application wherein the object now resides and may from that point forward provide all of the communication necessary to support that object within the client application.

Figure 5:
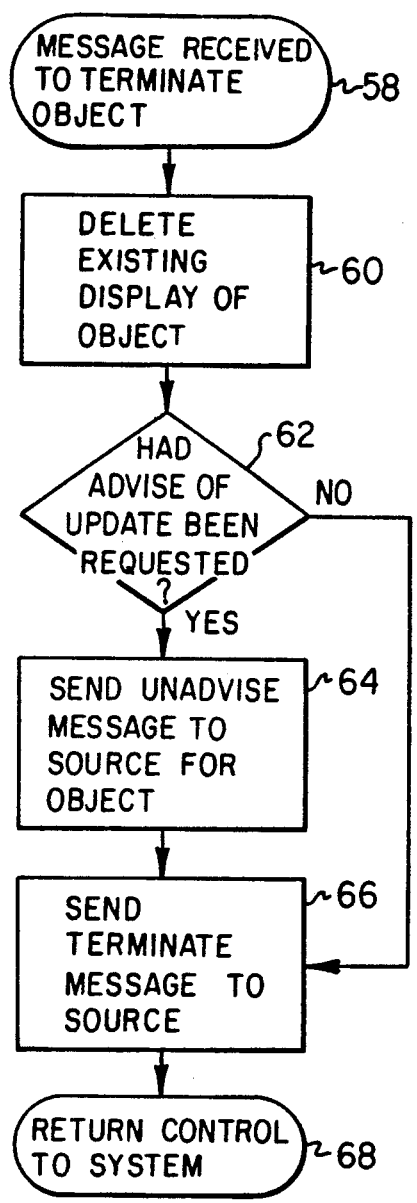
FIG. 5 depicts a logic flow chart illustrating the termination of communication between a source application and a client application.

With reference now to FIG. 5, there is depicted a logic flow chart illustrating the termination of a communications link between a source application and a client application, in accordance with the method of the present invention. As may be seen, this process begins, as illustrated in block 58, by the receipt of a message at the source application to terminate the communications link associated with a particular object or icon. Thereafter, block 60 depicts the deletion of the existing display of that object. Next, block 62 illustrates a determination of whether or not the user has requested advise of update with regard to this particular object. In one embodiment of the present invention, the "advise" message is utilized by the client application to request the source application to supply an update for a data item whenever it changes. In the even that this particular object has been the subject of an "advise" message, then block 64 illustrates the transmittal of an "unadvise" message to the source application for this object. As those skilled in the art will probably appreciate, the "unadvise" message is a request to the source application that a specified item should not longer be updated.

After the "unadvise" message has been transmitted, in accordance with block 64, or in the event that an "advise" message has not been requested, then block 66 illustrates the transmittal of a terminate message to the source application. Finally, block 68 illustrates the returning of the control to the system.

Those skilled in the art will appreciate upon reference to the foregoing specification that the initiation and termination of iconic exchange conversations utilizing the method of the present invention serves as a unique and relatively simple method for accomplishing the direct manipulation of icons. In the event a user wishes to duplicate a plurality of icons, he or she may simply broadcast a message to all source applications specifying the new client application name, causing all source applications to respond. Thereafter, DDE conversation links are automatically established between each source application and the new client application, causing the application to contain icons representing each existing source application.

As disclosed herein, if the user wishes to move one icon from one client application to another, this may be accomplished simply by terminating the link between the source application and the client application from which the icon was moved and automatically initiating a link between the source application and the client application to which the icon was moved. Very little additional code is required to implement this direct manipulation technique. The existing iconic control process provides the function necessary to detect the click of a mouse or other pointer device on an icon and to track the shadow box as the mouse is moved. When the mouse is released at the target application, the icon control process may be utilized to send a notification of the drop and information about the source application to the target application. In this manner, by utilizing DDE links to manage iconic information, a very small amount of code may be utilized to accomplish the direct manipulation of dynamically alterable icons between separate applications.

This technique may be utilized to provide an extremely visual working example of the use of DDE to establish permanent links between separate applications. Support from multiple conversation links is added simply by defining one additional message and making extensive use of the window word and window enumeration facilities which are provided by software applications such as *Windows* and *Presentation Manager*.

Those skilled in the art should appreciate that this expanded DDE link concept may be accomplished in several manners. For example, the second 32 bit parameter of DDE could be utilized to pass all necessary conversation parameters and references to data. Alternately, the second 32 bit parameter may be utilized as a 32 bit pointer to one of several available DDE data structures which may contain the conversation parameters and data references utilized to implement the iconic exchange method of the present invention.

While the invention has been particularly shown and described with reference to a preferred embodiment, it will be understood by those skilled in the art that various changes in form and detail may be made therein without departing from the spirit and scope of the invention.

We claim:

1. A method in a data processing system for permitting direct user manipulation of a graphic display of an icon within a window provided a first data processing application, said icon depicting an application which is supported and provided by a second data processing application via an interprocess communications link between said first data processing application and said second data processing application, said method comprising the steps of:

terminating said interprocess communications link between said first data processing application and said second data processing application in response to a deletion of said graphic display of said icon from said window provided by said first data processing application; and initiating an interprocess communications link between a third data processing application and said second data processing application in response to an initiation of a graphic display of said icon within a window provided by said third data processing application.

2. A method in a data processing system for permitting direct user manipulation of a graphic display of an icon within a window provided by a first data processing application, said icon depicting an application which is supported and provided by a second data processing application via an interprocess communications link between said first data processing application and said second data processing application, said method comprising the steps of:

creating a duplicate copy of said graphic display of an icon;

designating a location within a window provided by a third data processing application;

displaying said duplicate copy of said graphic display of an icon at said designated location within said window provided by said third data processing application; and initiating an interprocess communications link between said second data processing application and said third data processing application in response to said display of said duplicate copy of said graphic display of an icon at said designated location within said window provided by said third data processing application.

3. A data processing system for permitting direct user manipulation of a graphic display of an icon within a window provided by a first data processing application, said icon depicting an application which is supported and provided by a second data processing application via an interprocess communications link between said first data processing application and said second data processing application, said data processing system comprising:

means for terminating said interprocess communications link between said first data processing application and said second data processing application in response to a deletion of said graphic display of said icon from said window provided by said first data processing application; and means for initiating an interprocess communications link between a third data processing application and said second data processing application in response to an initiation of a graphic display of said icon within a window provided by said third data processing application.

4. A data processing system for permitting direct user manipulation of a graphic display of an icon within a window provided by a first data processing application said icon depicting an application which is supported and provided by a second data processing application via an interprocess communications link between said first data processing application and said second data processing application, said data processing system comprising:

means for creating a duplicate copy of said graphic display of an icon;

means for designating a location within a window provided by a third data processing application;

means for displaying said duplicate copy of said graphic display of an icon at said designated location within said window provided by said third data processing application; and means for initiating an interprocess communications link between said second data processing application and said third data processing application in response to said display of said duplicate copy of said graphic display of an icon at said designated location within said window provided by said third data processing application.

* * * * *